Figure 1:
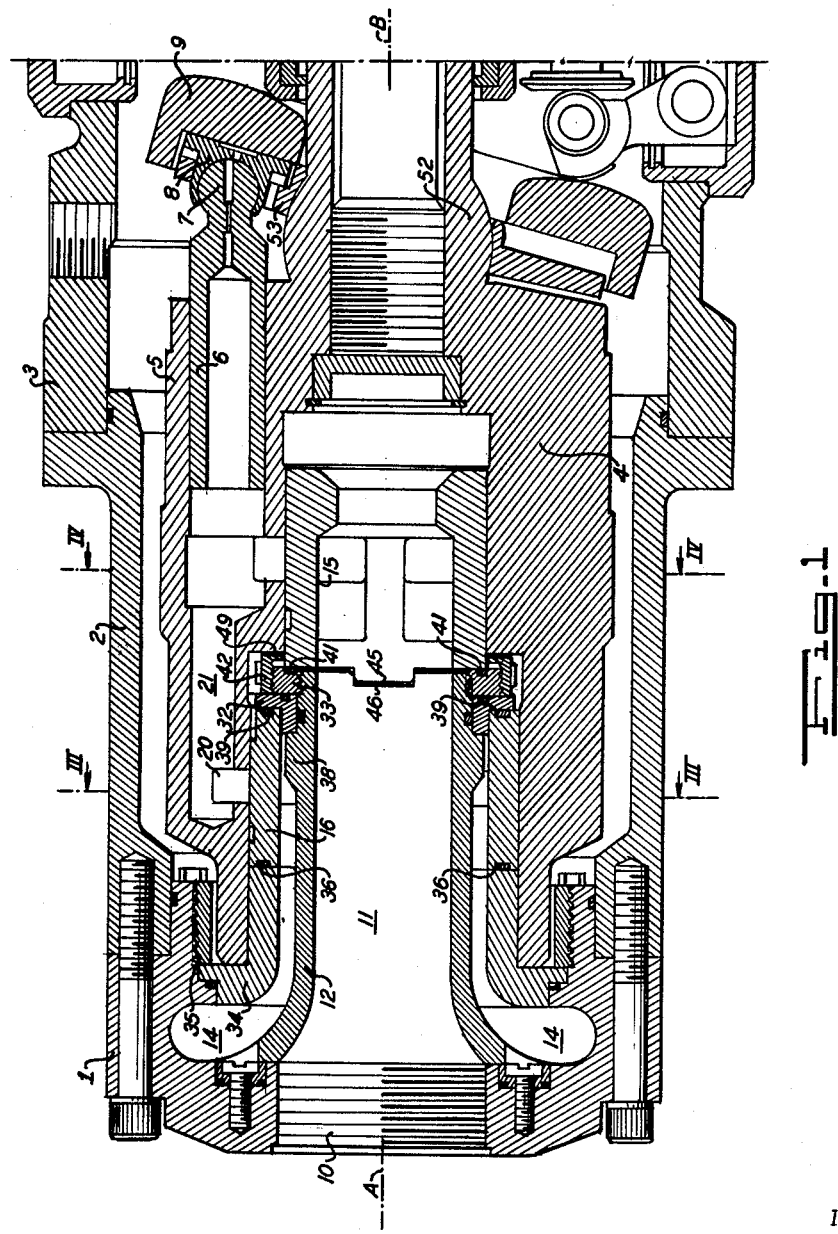

INVENTOR
GEORGES BOULET

INVENTOR
GEORGES BOULET

March 2, 1965

G. BOULET 3,171,361

MULTI-CYLINDER HYDRAULIC PUMPS ESPECIALLY OF PISTON-CHAMBER TYPE

Filed Aug. 8, 1962

8 Sheets-Sheet 4

INVENTOR
GEORGES BOULET

INVENTOR
GEORGES BOULET

INVENTOR
GEORGES BOULET

March 2, 1965

G. BOULET 3,171,361

MULTI-CYLINDER HYDRAULIC PUMPS ESPECIALLY OF PISTON-CHAMBER TYPE

Filed Aug. 8, 1962

8 Sheets-Sheet 8

INVENTOR
GEORGES BOULET

United States Patent Office 3,171,361
Patented Mar. 2, 1965

3,171,361
MULTI-CYLINDER HYDRAULIC PUMPS ESPECIALLY OF PISTON-CHAMBER TYPE
Georges Boulet, Toulouse, France, assignor to Société à Responsabilite Limitee: Recherches Etudes Production R.E.P., Paris, France, a corporation of France
Filed Aug. 8, 1962, Ser. No. 215,626
Claims priority, application France, Aug. 19, 1961, 871,139, Patent 1,313,768
8 Claims. (Cl. 103—162)

This invention relates to pumps and hydraulic engines with multiple cylinders arranged in a rotor. In pumps and engines of this kind, the pistons are driven by an inclined plate or cam, the liquid being admitted into such cylinders during a fractional turn of the rotor's revolution and ejected during part of the successive one; one thereof equalling a piston thrust and the other its return. To induce the liquid to pass from one static admission conduit of the stator of the pump into a rotor cylinder and thereupon into a likewise static stator rejection conduit the pump body is usually so built that the wall of each conduit constructionally forms part of the cylindrical surface of one of the pillow blocks wherein or around which the rotor rotates and so that it will provide passages respectively within the inner wall of the cylinder and those of the conduits, arranged so conveniently that, in a fractional turn of the cylinder any admission passage to the cylinder will relate to the conduit admission passages, and further so that, during a successive fractional turn, an escape tunnel for the cylinder relates to the passages of the escape conduit.

We established that in the pumps or hydraulic engines described, the clearance resulting from stroke actions, however slight, between pillow block and rotor, although mechanically tolerable, became intolerable as to steam tightness, because pump characteristics—pump duty and pressure, revolutionary speed of motors—failed to remain constant over a given period, i.e. stay as durably as the engine's mechanical longevity.

This invention is characteristic in that those parts of the pump stator, across which passages are provided to facilitate successive communication between admission conduits and discharge are constructed in the form of independent pillow-block couplage within or around which the motor rotates and are so fixed as to tolerate minimal axial and radial displacements, enabling them to follow those of the rotor, and in that means of elastic steam tightness are provided to guarantee such between said couplings and vicinal elements.

Another inventive characteristic consists in the hydraulic means of compensation of the axial thrust on the rotor.

The pillow blocks heretofore considered, as already described, might surround that part of the rotor element wherewith they co-operate; or, in contradistinction thereto, this part of the rotor might spin around the pillow-blocks. The result is that the inventively conformable admission and discharge sleeves may, too, be arranged like aforesaid thimble-couplings, i.e. the co-operative rotor element may turn inwards or outwards in relation to the joints; it is feasible, without passing beyond the inventive boundary, that pump or engine be constructed so that a rotor element rotates round the admission joint, whilst another part rotates inside the thimble joint, or vice versa.

Application of this invention will be described in the two constructional, non-limitative realisations, exemplified. Additional inventive features are illustrated in attached drawings.

The drawing shows only those pump elements essential for inventive appreciation.

First pump described is one where the two couplings are inside the co-operative rotor elements. In the pump described subsequently, the joints are outside the cooperative rotor elements.

Figure 2:
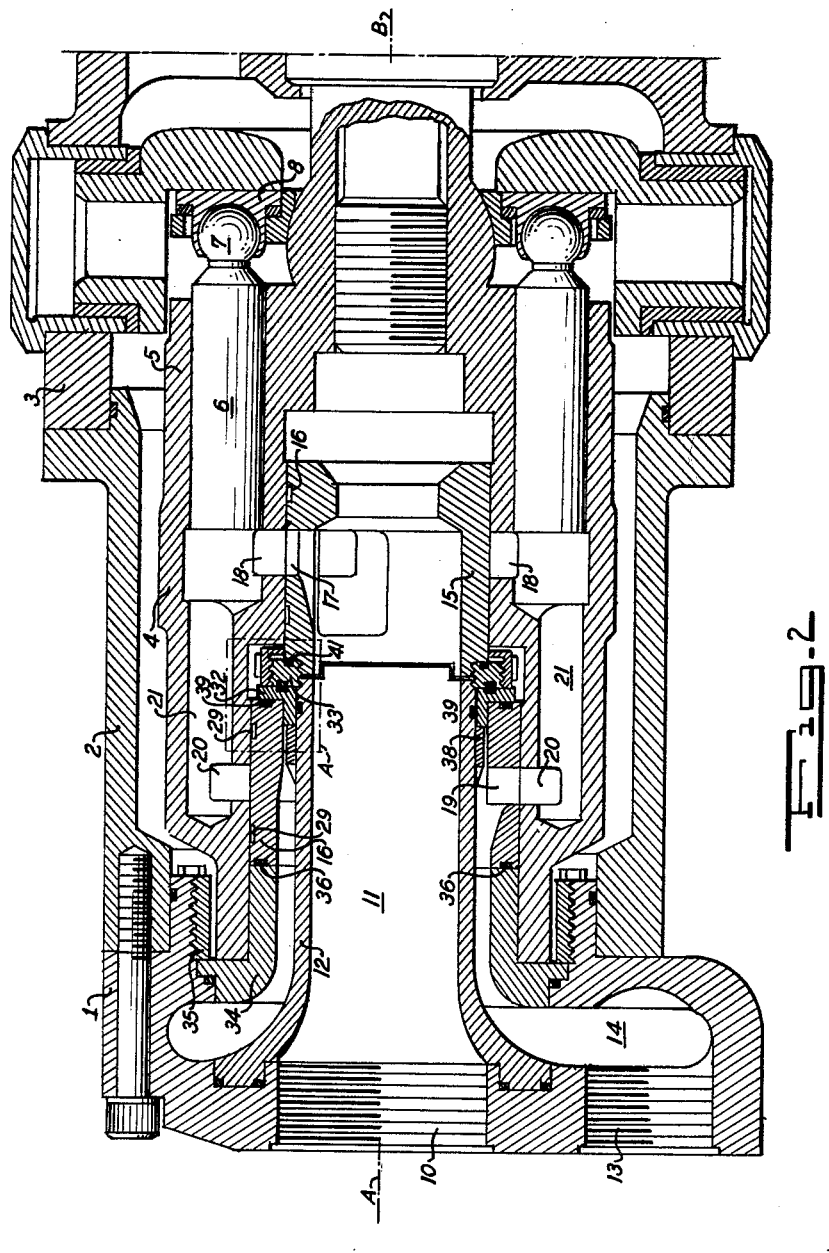
Figure 3:
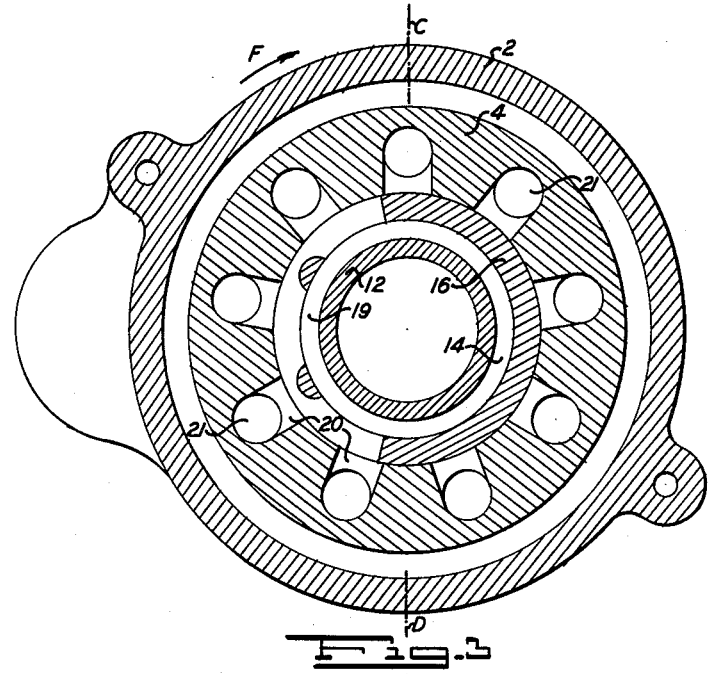
Figure 4:
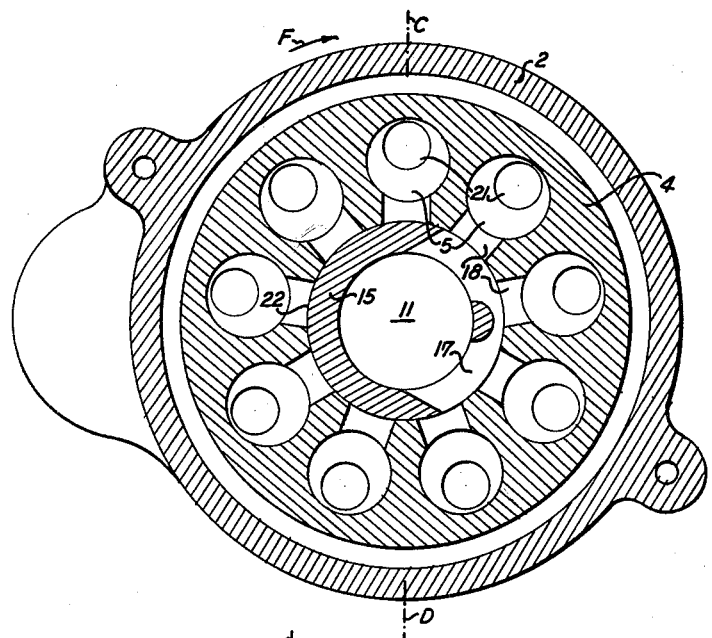
Figure 5:
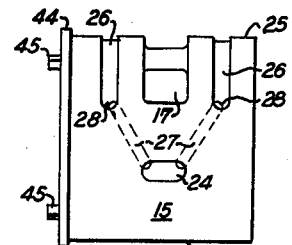
Figure 6:
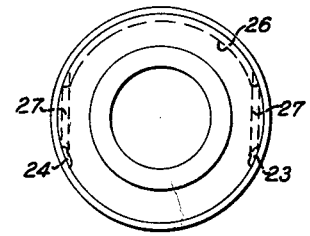
Figure 7:
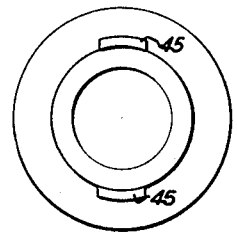
Figure 8:
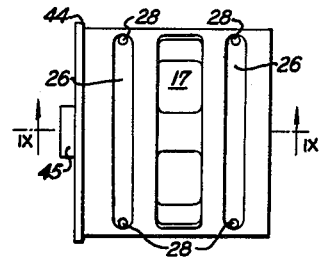
Figure 9:
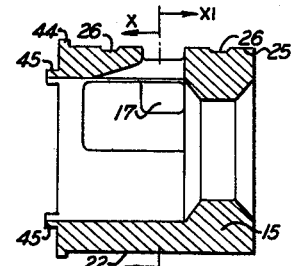
Figure 10:
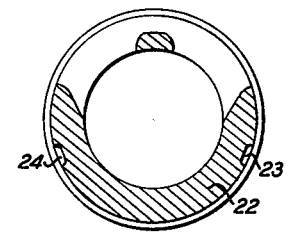
Figure 11:
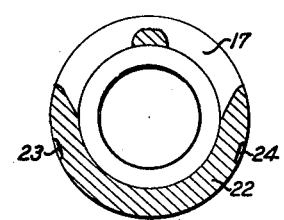
Figure 12:
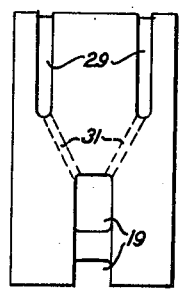
Figure 13:
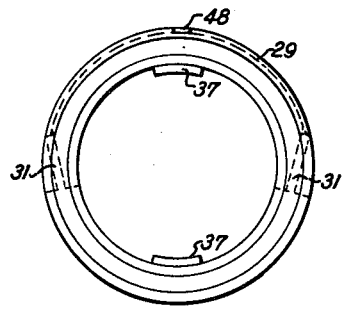
Figure 14:
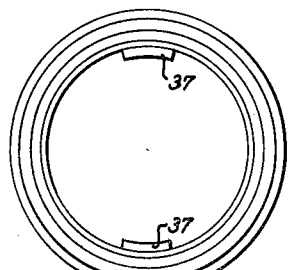
Figure 15:
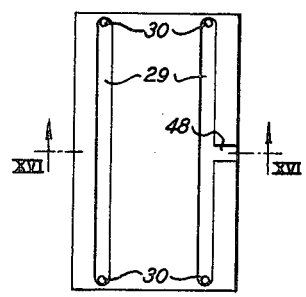
Figure 16:
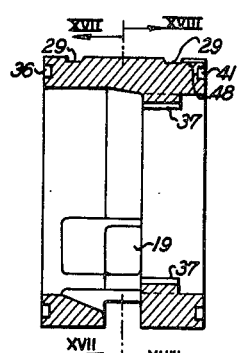
Figure 17:
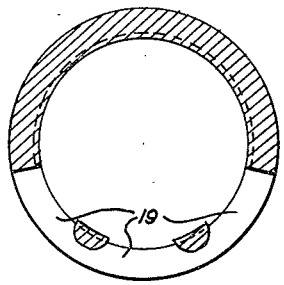
Figure 18:
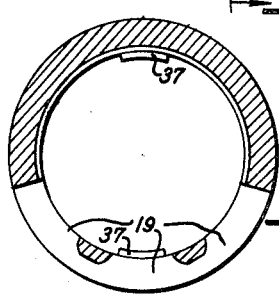
Figure 19:
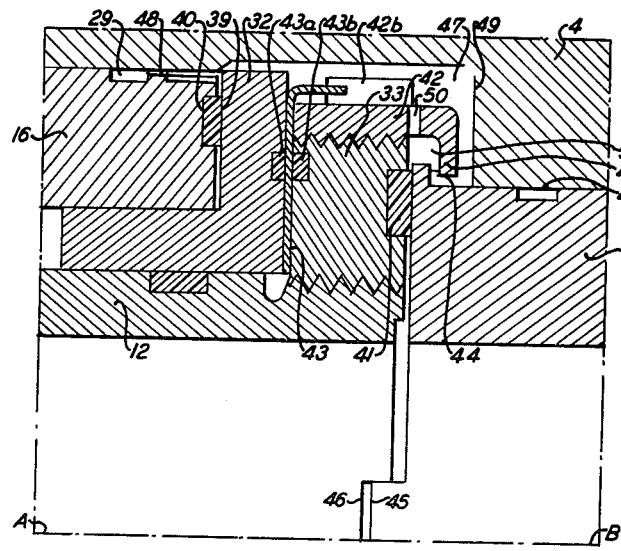
Figure 20:
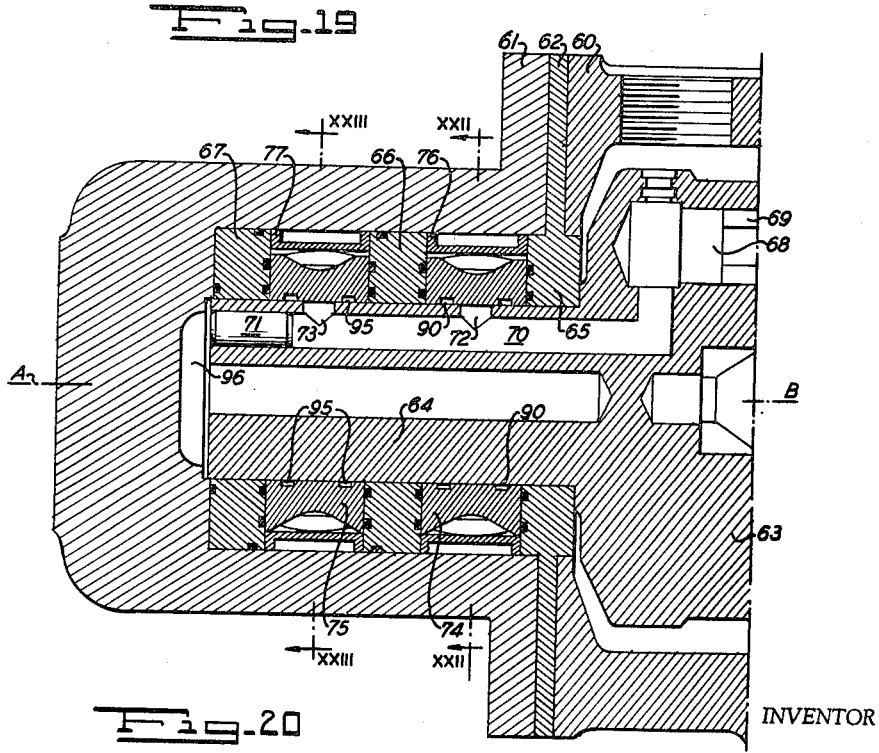
Figure 21:
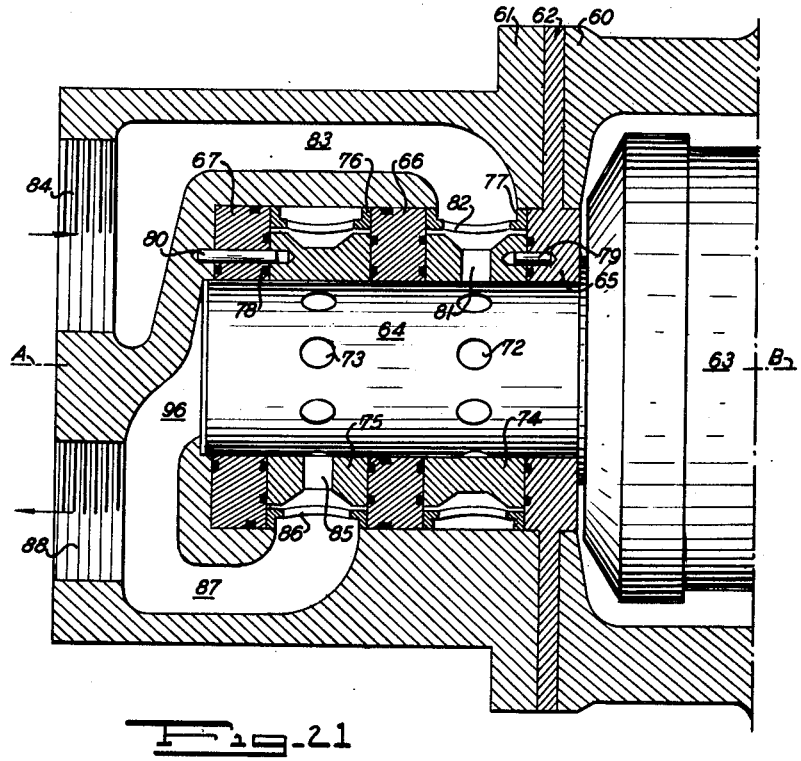
Figure 22:
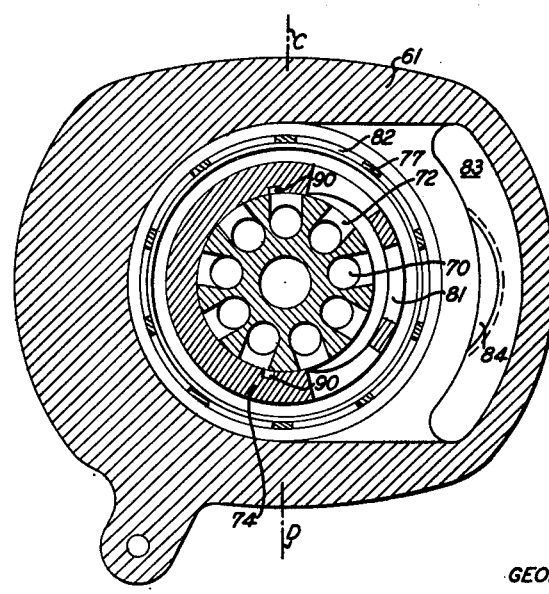
Figure 23:
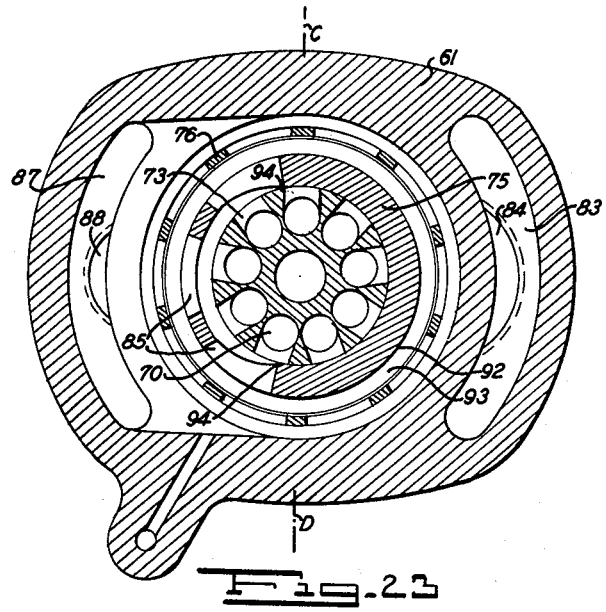
Figure 27:
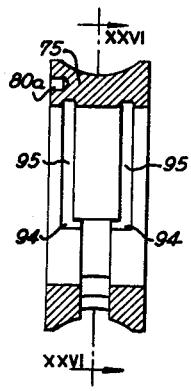
Figure 26:
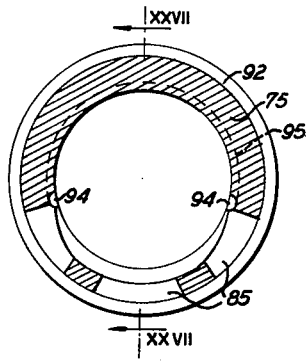
Figure 25:
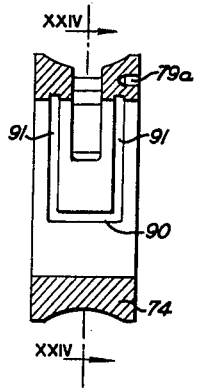
Figure 24:
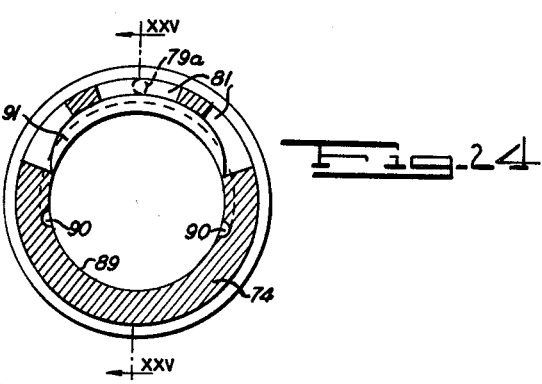

First pump is shown in FIGS. 1–19 of drawings where:
FIGURE 1 is an axial section of the inventive pump element.
FIGURE 2 is a section along AB of FIGURE 1.
FIGURES 3 and 4 are pump sections following III—III and IV—IV of FIGURE 1, respectively across the discharge joint and across the suction stroke.
FIGURE 5 is a view of the suction joint.
FIGURES 7 and 8 are respectively bird's eye view of FIGURE 5.
FIGURE 9 is a view of a section following IX—IX of FIGURE 8.
FIGURES 10 and 11 are respectively views of X—X and XI—XI of FIGURE 9.
FIGURE 12 elevation of discharge joint.
FIGURES 13, 14 and 15 respectively left, right and bird's eye view of FIGURE 12.
FIGURE 16 is a section following XVI—XVI of FIGURE 15.
FIGURES 17 and 18 are respectively views following XVII—XVII and XVIII—XVIII of FIGURE 16.
FIGURE 19 enlarges details inscribed within the framework of criss-crossed various outlines of FIGURE 2 (lit. and sic.).
FIGURES 20–27 show a second embodiment of the pump element.
FIGURE 20 is an axial section of the second embodiment of the pump element.
FIGURE 21 is a sectional view of the pump element taken along AB of FIGURE 20.
FIGURE 22 is a sectional view taken along XXII—XXII of FIGURE 20.
FIGURE 23 is a sectional view taken along XXIII—XXIII of FIGURE 20.
FIGURE 24 is a sectional view of the lifting element shown in FIGURE 22.
FIGURE 25 is a sectional view taken along XXV—XXV of FIGURE 24.
FIGURE 26 is a sectional view of the discharge joint shown in FIGURE 23.
FIGURE 27 is a sectional view taken along XXVII—XXVII of FIGURE 26.

With reference to FIGURES 1–4; elements 1, 2 and 3 are assembled in end to end relation to form a pump casing in which is accommodated a pump piston chamber constituted by a barrel 4 provided with cylinders 5 which is adapted for rotation about axis AB. Cylinders 5 are parallel to axis AB and nine cylinders 5 are shown. A piston 6 is slidably supported in each of the cylinders 5. Pistons 6 each have a ball-joint head 7, engaging in a socket 8 resting on an inclined track 9. The inclination of the track 9, causes the pistons during each revolution of the piston chamber to reciprocate within their respective cylinders. By varying the inclination of track 9 relative to axis AB the pump output is correspondingly varied.

Liquid is supplied to the cylinder 5 through inlet aperture 10 and inlet conduit 11 provided in sleeve 12, whereas discharge occurs through annular conduit 14 surrounding sleeve 12 and discharge orifice 13.

In the embodiment shown, rotor 4 is provided with a pillow block 34 and rotates freely around the external surface of an inlet sleeve 15 and an outlet sleeve 16. The inlet sleeve (FIGURE 4) is formed with radial ports 17 which, through radial passages 18, connect inlet conduit 11 with cylinders 5 of the piston chamber during the inlet phase, i.e. while they are moving within the zone situated to left of line CD of FIGURE 4. The exhaust sleeve 16 (FIGURE 3) is similarly equipped with radial ports 19 which, with passages 20 in rotor 4, connect extensions 21 of cylinders 5 with the annular discharge conduit 14 during the exhaust phase, i.e. while the cylinders, during rotation, travel through the zone of FIGURE 3 to the left of line CD. Arrow F indicates the rotor's rotational direction.

Such an arrangement produces:

(1) The inlet sleeve 15 (FIGURE 4) has its cylindrical outside left surface subjected to the exhaust pressure of the cylinders on the left of line CD tending to push the sleeve towards the right and to press its outer right surface towards the rotor.

(2) The exhaust sleeve 16 at its internal right surface (FIGURE 3) is subjected to discharge pressure tending to press the external right surface of the sleeve towards the rotor.

(3) One inventive aim is to remedy this double imbalance. For effective achievement thereof, the admission and discharge joints are thus constituted as follows: On part 22 of external surface of inlet sleeve 15, which is subjected to discharge pressure (FIGURES 5-11), symmetrical recesses 23, 24 are provided in and on the opposite external surfaces 25 are arcuate grooves 26, located at random in relation to ports 17. Each recess 23, 24 communicates via two drilled ways 27, with each of the grooves 26. By an appropriate choice of arcuate groove size relative to the rotor there can be generated a counter-pressure between outer surface 25 and the rotor capable of equilibrating the pressure tending to press the inlet sleeve against the rotor.

The same applies to exhaust sleeve 16 (FIGURES 12-18). To balance the pressure on the rotor of the external surfaces of sleeve 16, grooves 29 are provided on that part of the sleeve surface which presses on the rotor. At their ends, drilled ways 31 communicate with ports 19. The discharge pressure therefore is exerted in groove 29. The size of grooves 29 is regulated so that pressure exerted on the surface of the arcuate grooves by their liquid content virtually balances the pressure which the exhaust sleeve exerts on the rotor. It is appreciated that the joints being now balanced, friction and consequent wear and tear are considerably reduced, without steam-tightness being adversely affected.

To appreciate how the sleeves can successfully withstand the slight angular and axial buffetings previously mentioned and how the axial pressure exerted by the rotor on the pump body is balanced, details of the construction of the sleeves are given, and their assembly in the pump is explained with reference to FIGURE 19.

In FIGURES 1 and 2 it will be seen that sleeves 15 and 16 are mounted end to end with the interposition of an annular element 32 of L shaped section and a threaded ring 33.

Sleeve 16 is initially located at the end of pillow-block 34, which is fastened to the end of element 1 by a screw 35. A sealing ring is located in an annular groove 36 of the exhaust sleeve (FIGURE 16) insuring tightness between the two faces elements 34 and 16. Sleeve 16 is provided internally with two diametrically opposed dogs 37. The dogs 37 engage in two corresponding notches formed in a flange 38 on the outside surface of sleeve 12 (FIGURES 1 and 2). A slight "play" is allowed between dogs 37 and the notches in flange 38 facilitating minor displacements around and along its axial length. The annular ring 33 is fitted subsequently and screwed home on sleeve 12. A sealing ring 39 is accommodated in annular groove 40 in sleeve 16.

Sleeve 15 is thereupon placed in sleeve 12 at the end of sleeve 16 and ring 33, with the interposition of a sealing ring 41. It is held in position by an internally threaded ring 42, fastened on ring 33. It is furnished with internal joint flange 42a, which presses on an external flange 44 of the inlet sleve. The ring 42 has a projection 42b which, aided by an appropriate key, facilitates fastening it onto ring 33. A lock washer is inserted between the annular element 32 and the ring 33. The ring 42 and the sealing rings 43a and 43b having been pressed together, the locking washer is folded between two projections 42b and locks the ring 42. Engagement between the flanges 42a and 44 enables the degree of tightness between the sleeve 15 and the ring 33 to be adjusted during assembly. The same applies to the sealing ring 39 and its groove 40.

By these methods during assembly of the pump casing elements 1 and 2 the fixed elements of the pump can be consolidated while permitting relative freedom of movement and maintaining pressure-tightness between these and adjacent elements. In the inlet sleeve 15 (FIGURE 5) are two diametrically opposed external dogs 45 engaging in two notches 46 of the sleeve 12 (FIGURE 1), slight play therebetween permits slight movement of the inlet sleeve 15.

Compensation of axial rotor thrust on the pump body is achieved as follows: As seen in FIGURES 1 and 2 the cylinder pressure during the compression phase tends to push rotor 4 leftwards against element 34, serving as a thrust bearing therefor. Around 32 and 34 (FIGURE 19) is provided a chamber 47 into which the compressed liquid emanating from grooves 29 of sleeve 16 is conducted via a channel 48 (FIGURES 19 and 16). The counter-pressure of the liquid reacting on the annular surface 49, normally to the pump axis, is opposite to the pressure of the rotor on the pump stator. The surface is established in such a manner to achieve equilibrium between the opposing forces. A transversal conduit 50 is drilled into the ring 42 so as to carry the compressed liquid into the intervening space 51 between ring 42 and sleeve 15.

The degree of pressure established in the intervening space 51 and in chamber 47 facilitates control of the pressure on ring 41, by reason of the location and the respective joint surfaces of the ring and of the flange 44 of the inlet sleeve.

It is now expedient to observe that the system of establishing axial equilibrium of the rotor, such as is heretofore described, vividly demonstrates the undermentioned additional salient advantages:

Proceeding so that counter pressure exceeds counter-thrust—quite feasible by selecting an adequately large annular surface—the rotor is instead impelled rightwards by the now preponderant compensating hydraulic pressure. As discernible in FIGURE 1, the rotor's axial ball 52 pushes plate 53, and thereby the piston chamber towards inclined track 9, ensuring cooperation of sockets 8 and ball joints 7 of the pistons 6, and consequent withdrawal of the pistons 6 during their inlet stroke. A further consequence is that it opposes the piston's inertial forces at the end of their stroke at precise moment when direction of movement is about to be reversed.

An alternative constructional form of the pump is shown in FIGURES 20 and 27.

Therein is seen two pump body elements 60, 61 between which element 62 is interposed.

The exhaust sleeve 75 is provided, over part of its circumference, with radial passages 85 which communicate, through openings 86 in the retaining ring 76, with an exhaust gallery 87 which opens into the exhaust 88 of the pump.

Radial equilibrium of the inlet sleeve 74 is obtained in the following manner:

While the conduits 70 travel through that part of FIGURE 22 on the right of the line CD, they are in the inlet phase; those which are during this time on the left of the line CD are in the exhaust phase, and, through their radial orifices 72, the exhaust liquid exerts a pressure on the internal surface of the sleeve which is to the left of the line CD. This pressure is balanced by a counter-pressure which is exercised on the internal surface of the sleeve on the right of the line CD in the following manner: On the internal surface 89 of the sleeve (see FIG- URES 24 and 25), which receives the pressure, are axial grooves 90; these register with semicircular grooves 91, which extend over the other part of the internal surface of the sleeve in the middle part thereof. These grooves 91 thus receive the pressure of the liquid exhausted. Their surface is determined so that this counter-pressure approximately balances that on the opposite surface 89 of the sleeve.

The radial equilibrium of the exhaust sleeve is achieved similarly, see FIGURES 25, 26 and 27.

The outer surface 92 of the sleeve 75 which is on the right of the line CD is subjected to the exhaust pressure obtaining in the annular space 93. Axial grooves 94 debouching into the liquid under pressure are registered with semicircular grooves 95 on the inner surface of the sleeve 75. The pressure liquid introduced into these grooves exerts a counter-pressure opposing the pressure exerted by the outer surface 92. In FIGURES 24, 25 and 27 are shown openings 79a and 80a provided for the reception of the pegs 79 and 80.

The longitudinal equilibrium of the rotor is obtained in the following manner (see FIGURE 21): The exhaust sleeve is extended beyond the exhaust outlet 88 in a cul-de-sac 96 formed in the part 61 of the casing opposite the end of the driving shaft 64, so that the pressure exerted on the plugs 71 (FIGURE 20) at the ends of the conduits 70 in the exhaust phase and which tends to push the rotor towards the left is opposed by the pressure exerted on the shaft by the liquid in the cul-de-sac 96.

The preponderant thrust towards the right resulting therefrom and which acts on the rotor has this effect (as in the case of the pump hereinbefore described) that it ensures co-action between the sockets and the heads of the pistons during their inlet stroke and the additional effect of opposing the pistons' inertial forces at the end of their stroke as they undergo reversal.

It is to be understood that the invention is not limited to the two embodiments hereinbefore described, but that it applies equally well to a pump in which one of the sleeves is inside the rotor and the other sleeve is outside the rotor. Similarly, the invention may be applied to hydraulic motors instead of to pumps.

I claim:

1. A hydraulic pump comprising a stator having two chambers, one formed with an inlet aperture and the other formed with an outlet aperture for a liquid, a rotor provided with a plurality of cylinders each having an inlet and an outlet, a piston axially movable in each of said cylinders, means for controlling the stroke of said pistons, a pillow block supporting the rotor and two coaxial rotor sleeves independent of the pillow block supporting the rotor and formed with passages arranged to selectively put into communication the inlet apertures of one group of the cylinders with the first chamber, and the outlet apertures of the other cylinders with the second chamber in synchronism respectively with the stroke of said piston, the fit between said sleeves and said rotor being such that said sleeves are capable of permitting, in relation to the rotor, slight axial and radial movements.

2. A pump as claimed in claim 1, wherein the sleeves are cylindrical and are provided over the part of their cylindrical surface which is subjected to radial pressure with arcuate grooves communicating with a space provided in the pumps containing liquid under pressure.

3. A pump as claimed in claim 2 having a rotor and an axis of rotation thereof and in which the cylinders are parallel to said axis, the rotor rotating around two sleeves, an inlet sleeve disposed at the end of an axial inlet chamber and presenting passages communicating with radial inlet orifices during the inlet stroke of the pistons and an exhaust sleeve presenting passages communicating during the exhaust stroke of the pistons with radial exhaust orifices of the cylinders, and opening into an exhaust chamber surrounding the inlet chamber, the first sleeve being provided on its outer cylindrical surface with two arcuate grooves communicating respectively with recesses provided in the surface of the sleeve covering inlet orifices of the cylinders during the exhaust stroke, the second sleeve being provided on its outer surface with two arcuate grooves communicating with the passages of said sleeve.

4. A pump as claimed in claim 2 wherein the cylinders are parallel with the axis of the rotor, the rotor rotating inside two sleeves, the first sleeve being an inlet sleeve having passages communicating with the inlet orifices of the cylinders during a portion of the rotation of the rotor corresponding to the inlet stroke of the respective pistons and with the inlet chamber; the second sleeve being an exhaust sleeve communicating with the exhaust orifices of the cylinders during the exhaust stroke of their pistons, and with the exhaust chamber.

5. A pump as claimed in claim 3, wherein the part of the rotor rotating on the two sleeves forms an annular chamber therearound communicating via a longitudinal groove on the exhaust sleeve surface with one of the arcuate grooves of said sleeve, and wherein said chamber terminates at a location beside the pistons, a transversal partition on the surface of said exhaust sleeve bounding said chamber and on which the pressure of the liquid reacts in a direction opposite the axial thrust exerted by the rotor on the stator.

6. A pump as claimed in claim 4 wherein the inlet sleeve is provided with radial passages communicating with the inlet chamber and having on the inner surface of the sleeve arcuate grooves, said grooves having their corresponding ends linked by a perpendicular groove located in that part of the sleeve receiving through the cylinder inlet orifices the hydraulic pressure of the cylinders during their exhaust phase.

7. A pump as claimed in claim 4 wherein the exhaust sleeve is provided with radial passages which communicate with the exhaust chamber and, on its inner surface, opposite said passages, two arcuate grooves, the ends of which open into said passages.

8. A pump as claimed in claim 4 wherein the exhaust chamber comprises an extension having an orifice of which the periphery is applied to the end of the rotor, whereby the pressure exerted by the liquid under the pressure of said chamber on the end of the rotor opposes the pressure exerted by the rotor on the stator inversely.

References Cited by the Examiner
UNITED STATES PATENTS

| | | | |
|---|---|---|---|
| 941,646 | 11/09 | Olsen et al. | 103—161 |
| 1,925,378 | 9/33 | Ferries et al. | 103—162 |
| 2,022,653 | 12/35 | Chandler | 103—162 |
| 2,129,828 | 9/38 | Dunn | 103—162 |
| 3,062,151 | 11/62 | Eickmann | 103—121 |

FOREIGN PATENTS 1,207,087   8/59   France.

LAURENCE V. EFNER, *Primary Examiner.*